United States Patent [19]
Tippmer et al.

[11] 3,789,105
[45] Jan. 29, 1974

[54] AMMONIA-HYDROGEN SULFIDE-CYCLE SCRUBBING METHOD FOR CRUDE COKE OVEN GASES

[75] Inventors: Kurt Tippmer; Dieter Laufhutte, both of Recklinghausen, Germany

[73] Assignee: Firma Carl Still, Recklinghausen, Germany

[22] Filed: Nov. 10, 1971

[21] Appl. No.: 197,372

[30] Foreign Application Priority Data
Nov. 28, 1970 Germany.............................. 2058709

[52] U.S. Cl................................. 423/234, 423/238
[51] Int. Cl............................................ C01b 31/20
[58] Field of Search.... 423/233, 234, 236, 237, 238

[56] References Cited
UNITED STATES PATENTS
2,878,099   3/1959   Breving et al....................... 423/233

Primary Examiner—Earl C. Thomas
Assistant Examiner—S. B. Shear
Attorney, Agent, or Firm—John J. McGlew et al.

[57] ABSTRACT

Continuous treating process for scrubbing ammonia rich coke oven gases containing $H_2S$ involves regenerating ammonia rich $H_2S$ wash liquor in a deacidifier and distilling the ammonia from the $NH_3$ scrubber in a still. The cyclic process is carried out in two cycles: a first cycle in which regenerated, cooled, aqueous ammoniacal solution is circulated from the sump of the deacidifier to about the center or the upper parts of the $H_2S$-scrubber, and from the sump of the $H_2S$-scrubber back to the upper part of the deacidifier; and a second, hot cycle in which the regenerated aqueous ammoniacal solution issuing from the sump of the deacidifier is circulated to the upper part of the $H_2S$-scrubber.

6 Claims, 1 Drawing Figure

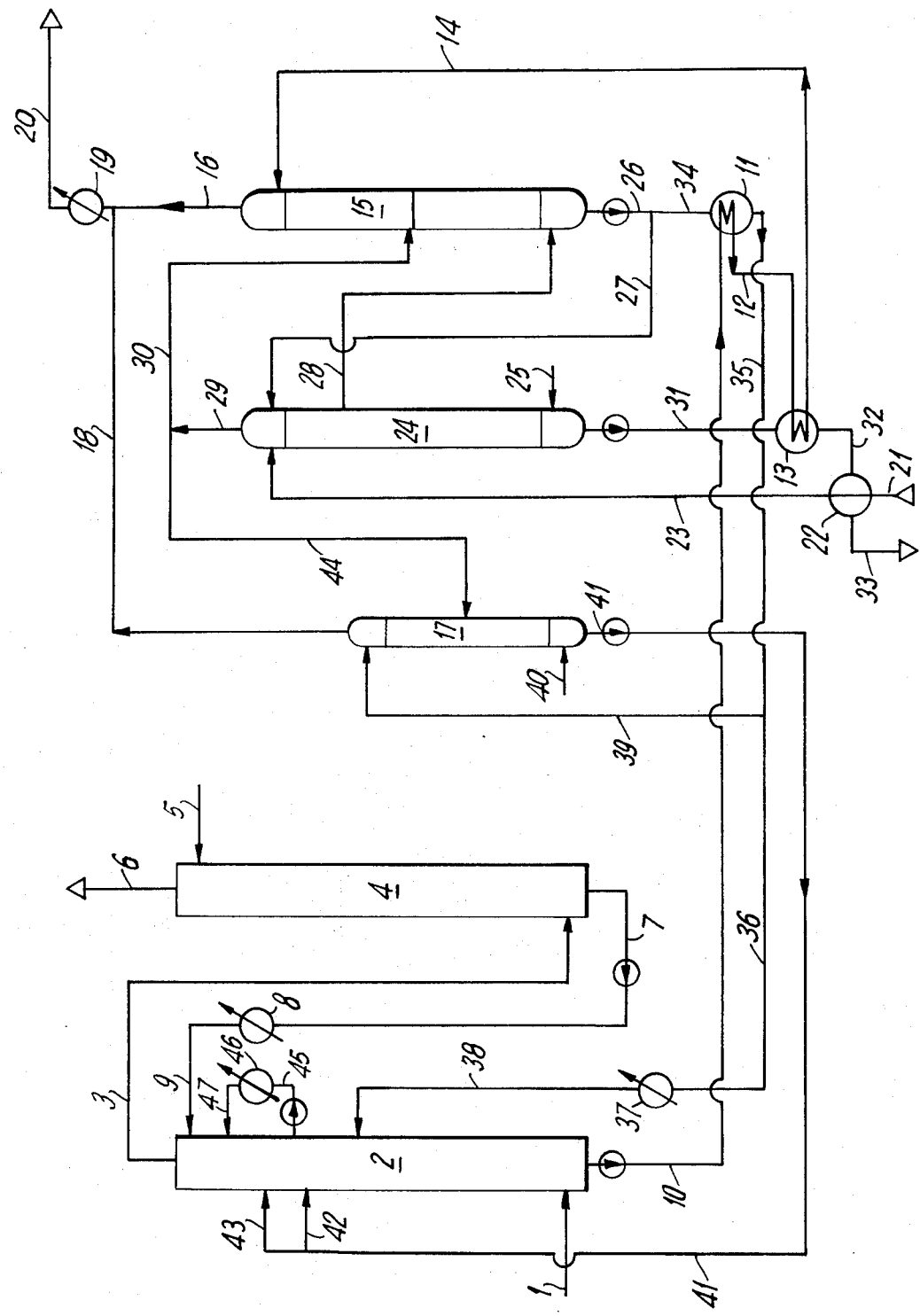

AMMONIA-HYDROGEN SULFIDE-CYCLE SCRUBBING METHOD FOR CRUDE COKE OVEN GASES

BACKGROUND OF THE INVENTION

The so-called ammonia-hydrogen sulfide cycle scrubbing method is known where the hydrogen sulfide is scrubbed out of the crude coke oven gas with circulating aqueous ammonia and the ammonia with water, sometimes by using so-called "coal water," and the ammoniacal $H_2S$ wash water is regenerated in a deacidifier and the ammonia is distilled from the ammoniacal wash water in a still. Up to 85 percent $H_2S$ and over 99 percent $NH_3$ are scrubbed out from the crude gas. By special measures, it is possible to increase the $H_2S$ scrubbing effect. These consist, for example, in introducing the gaseous ammonia in the form of vapors from the distiller head into the upper part of the $H_2S$ scrubber. These prior art methods require a considerably higher consumption of steam.

SUMMARY OF THE INVENTION

The invention concerns a new method which requires no additional consumption of steam at all and which removes the hydrogen sulfide from the coke-oven with efficiency of more than 85 percent, namely, up to 95 percent efficiency.

According to a special embodiment of the method of the invention, however, it is possible to remove up to over 98 percent hydrogen sulfide from the gas with only a slight additional consumption of steam.

It is an object of the invention to provide a new ammonia-hydrogen sulfide-cycle scrubbing process for treating coke oven gases where the ammonia rich $H_2S$ wash liquor is regenerated in a deacidifier and the ammonia is distilled from the $NH_3$-scrubber in a still. The process comprises: a first cycle in which regenerated, cooled, aqueous ammoniacal solution is circulated from the sump of the deacidifier to about the center or the upper parts of the $H_2S$-scrubber, and from the sump of the $H_2S$-scrubber back to the upper part of the deacidifier; and a second, hot cycle in which the regenerated aqueous ammoniacal solution issuing from the sump of the deacidifier is circulated to the upper part of the $H_2S$-scrubber, and from the sump of the $H_2S$-scrubber back to the upper part of the deacidifier.

The new method of the invention effects an improvement of the $H_2S$ scrubbing efficiency of up to 95 percent without using more steam than for a scrubbing efficiency of only 85 percent.

While wash liquor in the first, cool cycle is charged in a known manner with temperatures of about 18° to 25° C into the $H_2S$-scrubber, the charging temperature in the second hot cycle is adjusted to over 40° C, preferably to about 41° to about 60°C. The molar ratio $NH_3/H_2S$ in the regenerated wash liquors is about 10 to 15 mol $NH_3$/mol $H_2S$.

The liquid of the second cycle is charged at different points of the upper $H_2S$-scrubber under different liquid distributions and expanded. Ammonia evaporating from the second cycle is absorbed by the other wash liquors, namely, those of the first cycle and the ammoniacal wash water charged into the $H_2S$-scrubber. The heat of solution of the ammonia is eliminated by an internal cooling cycle conducted over the upper part of the $H_2S$-scrubber.

In another embodiment of the invention, the $H_2S$ scrubbing effect is considerably improved if the wash liquor of the second cycle is strengthened by vapor condensates from the still head and by distilling off the $H_2S$ portions.

Particularly favorable results are obtained with the new method if the wash liquor of the second cycle is strengthened to a molar ratio $NH_3/H_2S$ of about 40 to 70 mol $NH_3$/mol $H_2S$. This is attainable with the 98 percent scrubbing of $H_2S$ achieved according to this embodiment.

DESCRIPTION OF SPECIFIC EMBODIMENTS

The invention will be described by the following example with reference to the drawing. In this specification, the following are defined:

N = equivalent weight in grams;
g = grams,
kg = kilogram(s);
h = hour(s);
t = tons (2000 pounds);
deg. = degree (s);
at = atmosphere(s) = 15 pounds/inch$^2$; and
C = Centigrade 80,000 Nm$^3$/h crude coke oven gas adjusted to 22°–25° C with 7.0 $H_2S$/Nm$^3$, 6.0 g $NH_3$, and 40 g $CO_2$/Nm$^3$ enter the $H_2S$-scrubber through line 1 from the bottom, and the wash liquors trickle in counterflow. The gases liberated of $H_2S$ leave the $H_2S$-scrubber 2 through line 3 and enter the $NH_3$-scrubber 4 at the bottom, to which 24 m$^3$/h fresh water at 22° C are fed through line 5, which scrub the ammonia out of the crude gas. The purified gas leaves the $NH_3$-scrubber through line 6 and still contains 0.01 g/Nm$^3H_2S$.

The wash water accumulates in the bottom of the $NH_3$-scrubber 4 and is withdrawn through line 7 and, after cooling in cooler 8 to 25°C, the wash water is charged through line 9 into the $H_2S$-scrubber. The so-obtained ammoniacal wash waters amount to 96 m$^3$/h and they are withdrawn from the $H_2S$-scrubber 2 through line 10. These waters are preheated in heat exchanger 11 to 74°C and fed through line 12 to heat exchanger 13 in which they are heated to 84°C. Then they are fed through line 14 to the top of deacidifier 15. 3,340 Nm$^3$/h vapors of 90°C and 461 kg $H_2S$ and 360 kg $NH_3$ leave the deacidifier through line 16. These vapors of $NH_3$ and $H_2S$ are combined with 800 Nm$^3$/h vapors, with 91 kg $H_2S$, and with 120 kg $NH_3$ from the concentration column 17 and line 18. The combined vapors are cooled by partial condenser 19 to 70°C and conducted through line 20 for further processing. 32 m$^3$/h coal water at 70°C are fed to still 24 through line 21, heat exchanger 22 and line 23.

9 t/h saturated steam of 2 at. are fed through line 25, and through lines 26 and 27 20 m$^3$/h deacidified excess $H_2S$-wash water at 90°C. Ammoniacal vapors are returned from the still through the lines 28, 29 and 30 into deacidifier 15 and the deacidifier is thus supplied with ammonia and the necessary heating and stripping steam. Ammonia-free wash water is withdrawn from the still in an amount of 66 m$^3$/h through lines 31 to 33, cooled in the heat exchangers 13 and 22 to 60°C, and discharged from the plant. Through line 34 70.7 m$^3$/h ammoniacal wash water containing 23 kg $NH_3$/m$^3$, 4 kg $H_2S$/m$^3$ (molar ratio $NH_3/H_2S$ = 15) and 4 kg $CO_2$/m$^3$ leave the deacidifier; they are precooled in heat exchanger 11 and conducted through line 35. 56 m³/h of this amount are fed through line 36 to cooler 37 in which they are cooled to 30 C. Through line 38 they are charged again into the H₂S-scrubber. The first cycle is thus closed.

For the second cycle, 14.7 m³/h of the ammonical wash water in line 35 are conducted through line 39 into concentration column 17 which is supplied through line 40 with 1 t/h saturated steam of 2 at. In addition, 2,550 Nm³/h coke oven vapors are introduced from still 24 through lines 29 and 44.

16 m³/h strenthened ammoniacal wash water containing 39 kg/m³ $NH_3$, 2.5 kg/m³ of $H_2S$ and 3.2 kg/m³ of $CO_2$ leave concentration column 17 through line 41 (molar ratio $NH_3/H_2S = 31.6$) at 80°C. After cooling to 50° C, the $NH_3/H_2S$ vapors are fed in a ratio of 4/1 through lines 42 and 43 to the H₂S-scrubber under a distributor bottom and the second cycle is thus closed.

The lines 45 and 47 and cooler 46 represent an internal cooling cycle in the upper part of H₂S-scrubber 2.

A total of 10 t/h saturated steam have been used and a 98 percent scrubbing of $H_2S$ has been achieved.

According to the known methods without use of the second cycle, that is, without the apparatus parts 17, 18 and 40 to 47, a total of 9 t/h saturated steam of 2 at. are used up, but only an 85 percent scrubbing of $H_2S$ is achieved.

While specific embodiments of the invention have been shown and described in detail to illustrate the application of the principles of the invention, it will be understood that the invention may be embodied otherwise without departing from such principles.

What is claimed is:

1. Continuous cyclic scrubbing process for scrubbing out ammonia and hydrogen sulfide from crude coke oven gas which comprises:
    a. scrubbing the crude coke oven gas in a first step for removing $H_2S$ in an H₂S scrubber with recycled aqueous wash liquid containing free ammonia;
    b. scrubbing the so-obtained crude coke oven gas free from $H_2S$ in a second step in an ammonia scrubber with water, removing the $NH_3$ from the scrubbed gas, and passing the wash water enriched with $NH_3$ from scrubbing into the H₂S scrubber;
    c. de-acidifying the ammoniacal wash water laden with $H_2S$ from the H₂S scrubber in a de-acidifier and separating the $H_2S$ therefrom thereby regenerating said wash water;
    d. distilling off in a still and separating the whole of the free ammonia contained in one portion of the deacidified wash water;
    e. in a first cycle, cooling and passing another portion of deacidified wash water containing ammonia at a temperature of about 18° to 25° C from the sump of the deacidifier to about the center or upper part of the H₂S scrubber and passing the water enriched with $H_2S$ from the sump of the H₂S scrubber back to the upper part of the deacidifier; and
    f. in a second additional cycle, passing the regenerated aqueous ammoniacal wash water heated at a temperature of about 40° to 60° C from the sump of the deacidifier to a plurality of different points in the upper part of the H₂S scrubber, and thereafter passing the wash water enriched with $H_2S$ and united with the wash water of the first cycle from the sump of the H₂S scrubber to the upper part of the deacidifier.

2. Continuous cyclic scrubbing process according to claim 1, wherein the wash water is charged to a plurality of different points in the H₂S scrubber in the first regeneration cycle at temperatures of from about 18° to 25° C and in the second cycle, at a temperature of from about 40° to about 60° C.

3. Continuous cyclic scrubbing process according to claim 1, wherein cooling in the cycle is conducted internally over the upper part of the H₂S scrubber.

4. Continuous cyclic scrubbing process according to claim 1, wherein the wash water of the second cycle is fortified by addition thereto of vapor condensates from the head of the still and from distillation of the $NH_3$ portions.

5. Continuous cyclic scrubbing process according to claim 4, wherein the wash water of the second cycle is strengthened with a molar ratio of $NH_3/H_2S$ of from about 10 to about 15 mol.mol in the first regeneration cycle, to a molar ratio of $NH_3/H_2S$ of from about 40 to about 70 mol/mol.

6. Continuous process according to claim 1, wherein the so-heated regenerated aqueous ammoniacal wash water of the second cycle is charged to the H₂S scrubber below the point at which the ammoniacal wash water is introduced into the H₂S scrubber from the ammonia scrubber.

* * * * *